US006608135B1

(12) United States Patent
Patel et al.

(10) Patent No.: US 6,608,135 B1
(45) Date of Patent: *Aug. 19, 2003

(54) POLYMER COMPOSITIONS

(75) Inventors: Raman Patel, Providence, RI (US); Dan Mallin, Lincoln, RI (US); Keith Saunders, Cumberland, RI (US); Patrick Tiberio, Mansfield, MA (US); John Andries, East Greenwich, RI (US)

(73) Assignee: Teknor Apex Company, Pawtucket, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/479,617

(22) Filed: Jan. 7, 2000

Related U.S. Application Data

(63) Continuation of application No. 09/056,182, filed on Apr. 6, 1998, now Pat. No. 6,034,176.
(60) Provisional application No. 60/080,200, filed on Mar. 31, 1998.

(51) Int. Cl.[7] .................... C08L 31/04; C08L 35/02; C08L 51/00; C08L 23/04; C08L 23/10; C08G 67/02
(52) U.S. Cl. ................ 524/504; 524/505; 525/63; 525/80; 525/88; 525/222
(58) Field of Search .............. 525/63, 80, 88, 525/222; 524/501, 504, 505

(56) References Cited

U.S. PATENT DOCUMENTS

| 4,555,546 A | 11/1985 | Patel .......................... 525/194 |
| 4,839,412 A | 6/1989 | Harrell et al. |
| 4,968,747 A | 11/1990 | Mallikarjun ................ 525/74 |
| 5,079,316 A | 1/1992 | Sun et al. .................... 525/539 |
| 5,124,410 A | 6/1992 | Campbell .................... 525/293 |
| 5,128,410 A | 7/1992 | Ilendra et al. |
| 5,202,380 A | 4/1993 | Ilenda et al. ................. 525/71 |
| 5,206,294 A | 4/1993 | Dawson ....................... 525/196 |
| 5,264,491 A | 11/1993 | Quick ......................... 525/177 |
| 5,317,059 A | 5/1994 | Chundry et al. ............. 525/66 |
| 5,344,884 A | 9/1994 | Benham et al. ............. 525/222 |
| 5,352,739 A | 10/1994 | Arunjun ...................... 525/75 |
| 5,378,539 A | 1/1995 | Chen .......................... 428/378 |
| 5,395,881 A | 3/1995 | Spelthann ................... 525/63 |
| 5,434,217 A | 7/1995 | Spelthann ................... 525/63 |
| 5,618,881 A | 4/1997 | Hojabar ...................... 525/164 |
| 6,034,176 A | * 3/2000 | Patel et al. ................... 526/63 |

FOREIGN PATENT DOCUMENTS

| EP | 870650 | | 3/1959 |
| EP | 0 212 575 | A2 | 8/1986 |
| EP | 0 274 424 | | 7/1988 |
| EP | 0 287 928 | B1 | 10/1988 |
| EP | 0 383 147 | A1 | 8/1990 |
| EP | 0 432 575 | B1 | 6/1991 |
| EP | 0 526 230 | B1 | 2/1993 |
| EP | 0 341 268 | B1 | 8/1993 |
| EP | 0 558 990 | B1 | 9/1993 |
| EP | 0 656 390 | A1 | 6/1995 |
| EP | 703271 | * | 3/1996 |
| EP | 0 802 235 | A1 | 10/1997 |
| EP | 0 874 022 | A1 | 10/1998 |
| WO | WO 94/04610 | * | 3/1994 |

\* cited by examiner

*Primary Examiner*—Callie Shosho
(74) *Attorney, Agent, or Firm*—Fish & Richardson P.C.

(57) ABSTRACT

Polymer compositions including an olefinic polymer, a polar polymer and a compatibilizer are disclosed. The compatibilizer can be a block or graft copolymer including polymer portions that are compatible with the olefinic polymer and polymer portions that are compatible with the polar polymer.

58 Claims, No Drawings

POLYMER COMPOSITIONS

CROSS REFERENCE TO RELATED APPLICATION

This application is a continuation of U.S. application Ser. No. 09/056,182, filed Apr. 4, 1996, now U.S. Pat. No. 6,034,176.

BACKGROUND OF THE INVENTION

The invention relates to polymer compositions.

Polymer compositions that include polar polymers and olefinic polymers are known. These polymer compositions often include one or more additional compounds which act as compatibilizers for the polar and olefinic polymers.

SUMMARY OF THE INVENTION

The invention relates to polymer compositions. These compositions can exhibit good flame retardancy and/or low smoke formation. The polymer compositions can provide good mechanical properties, such as tensile strength and elongation. The polymer compositions can contain small amounts of halogens. The compositions can be in the form of a blend.

In one aspect, the invention features a polymer blend that includes an olefinic polymer, a polar polymer and an additional polymer that includes first and second polymer portions. The first polymer portion is compatible with the olefinic polymer, and the second polymer portion is compatible with the polar polymer.

In another aspect, the invention features a method of making a polymer composition. The method includes forming a polymer comprising first and second polymer portions in a mixture. The mixture includes an olefinic polymer and a polar polymer. The first polymer portion is compatible with the olefinic polymer, and the second polymer portion is compatible with the polar polymer.

In another aspect, the invention features a method of forming a polymer composition. The method includes forming a polymer containing first and second polymer portions, and mixing the polymer in a mixture. The mixture includes an olefinic polymer and a polar polymer. The first polymer portion is compatible with the olefinic polymer, and the second polymer portion is compatible with the polar polymer.

DESCRIPTION OF THE PREFERRED EMBODIMENTS

The preferred compositions include an olefinic polymer, a polar polymer and a compatibilizer. The compatibilizer can be a block or graft copolymer. The compatibilizer includes at least one olefinic polymer portion that is compatible with the olefinic polymer, and the compatibilizer includes at least one polar polymer portion that is compatible with the polar polymer. The polymer portions can be in the form of blocks.

Typically, the compositions are in the form of a blend in which the components of the composition are intermixed. The blend can be a homogeneous blend.

Olefinic polymers are formed primarily of olefin monomers which are hydrocarbon monomers having at least one carbon-carbon double bond. Olefin monomers can be straight chained, branched or cyclic hydrocarbons. Examples of olefin monomers include ethylene, propylene, butylene and pentene. Examples of olefinic polymers include polyethylene, ethylene copolymers, polypropylene, propylene copolymers, ethylene propylene copolymers and polymethylpentene polymers.

In addition to olefin monomers, an olefinic polymer can include a minor amount of non-olefinic monomers, such as ethylene acrylic monomers. Preferably, an olefinic polymer includes less than about 20 weight percent non-olefinic monomers, more preferably less than about 10 weight percent non-olefinic monomers and most preferably less than about 5 weight percent non-olefinic monomers.

Preferably, an olefinic polymer includes at least about 80 weight percent olefin monomers, more preferably at least about 90 weight percent olefin monomers, and most preferably at least about 95 weight percent olefin monomers.

Olefinic polymers preferably include less than about 2 weight percent halogen, more preferably less than about 1 weight percent halogen and most preferably less than about 0.5 weight percent halogen.

Olefinic polymers are available from, for example, Exxon, Mobil, Chevron, Amoco, Dow, Quantum, Solvay, Novacor, Rexene, Aristech, Hoechst Celanese, Fina, Montall and Shell.

A polar polymer includes olefin monomers and polar monomers having the formula $CH_2=CHOCOR$, where R is a hydrocarbon group that can be straight chained or branched, saturated or unsaturated, and substituted or unsubstituted. Typically, R is a straight chained, saturated and unsubstituted alkyl group having from one to five carbon atoms, such as a methyl group, an ethyl group or a butyl group. In a polar polymer, a portion of the polar monomers can be hydrolyzed.

A polar polymer can include additional functional monomers such as carbon monoxide, acrylic monomers, glycidyl acrylic monomers, acid monomers, anhydride monomers, and/or nitrile monomers.

Preferably, a polar polymer includes from about 20 weight percent to about 90 weight percent olefinic monomers, more preferably from about 35 weight percent to about 85 weight percent olefinic monomers, and most preferably from about 50 weight percent to about 80 weight percent olefinic monomers.

Preferably, a polar polymer includes from about 10 weight percent to about 80 weight percent polar monomers, more preferably from about 15 weight percent to about 65 weight percent polar monomers, and most preferably from about 20 weight percent to about 50 weight percent polar monomers.

Preferably, a polar polymer includes at most about 15 weight percent additional functional monomers, more preferably from about 2.5 weight percent to about 10 weight percent additional functional monomers.

Polar polymers preferably include less than about 2 weight percent halogen, more preferably less than about 1 weight percent halogen, and most preferably less than about 0.5 weight percent halogen.

In a preferred embodiment, the polar polymer is a terpolymer of ethylene monomers, vinyl acetate monomers and carbon monoxide.

Polar polymers are available from, for example, Exxon, .Quantum, DuPont, Union Carbide, AT Plastics, Chevron, Bayer, Mitsubishi Petrochemicals and Sumitomo.

The compatibilizer is typically a graft or block copolymer that includes at least one olefinic polymer portion and at least one polar polymer portion. The polymer portions can be in the form of blocks.

The olefinic polymer portion is formed of an olefinic polymer, and the polar polymer portion is formed of a polar polymer. The olefinic polymer portion should be selected to be compatible with the olefinic polymer, and the polar polymer portion should be selected to be compatible with the polar polymer. Generally, the olefinic polymer portion of the compatibilizer and the olefinic polymer have substantially the same polarity, and the polar polymer portion of the compatibilizer and the polar polymer have substantially the same polarity.

Preferably, the olefinic polymer portion of the compatibilizer is the same polymer as the olefinic polymer. For example, if the olefinic polymer is polyethylene, the olefinic polymer portion of the compatibilizer is also polyethylene.

Preferably, the polar polymer portion of the compatibilizer includes functional groups that are the same as the functional groups in the polar polymer. For example, if the polar polymer is ethylene vinyl acetate, the polar polymer portion of the compatibilizer includes vinyl acetate monomers.

The polymer compositions can include from about 15 weight percent to about 65 weight percent olefinic polymer, from about 20 weight percent to about 80 weight percent polar polymer, and from about 1 weight percent to about 40 weight percent compatibilizer.

The olefinic polymer portions and polar polymer portions of the compatibilizer can be directly chemically bonded or they can be connected by a linking agent that is chemically bonded to an olefinic polymer portion and an adjacent polar polymer portion.

When a linking agent is not used, the compatibilizer can be formed by reacting two polymers that contain functional groups that react to provide the compatibilizer. This reaction can occur in a mixture that contains the olefinic polymer and the polar polymer. Alternatively, the compatibilizer can first be formed then added to a mixture that contains the olefinic polymer and the polar polymer.

An amine and/or epoxy containing polymer, such as a nitrile rubber, can be reacted with an acid or anhydride containing polyolefin. An acid or anhydride containing polymer, such as a nitrile rubber, can be reacted with an amine and/or epoxy containing polyolefin. An isocyanate containing polyester (typically having a low molecular weight) can be reacted with an acid, anhydride or epoxy containing polyolefin. A compatibilizer can be formed by reacting an epoxy containing terpolymer of ethylene, vinyl acetate and carbon monoxide with a maleic acid modified polypropylene. A compatibilizer can be formed by reacting an ethylene methyl acrylate acid containing polar polymer with an epoxy containing styrene ethylene butylene styrene block copolymer.

Preferably, the functional groups that react to form the compatibilizer are at the terminus of the polymers.

Examples of linking agents include diepoxides, diamines and diisocyanates which can be reacted with an acid modified polar polymer and an acid modified olefinic polymer to provide a compatibilizer.

The polymer compositions can be prepared using standard mixing methods. For example, the polymer compositions can be formed using a Banbury mixer, a Brabender mixer and/or a twin screw mixer. Generally, twin screw mixers provide a higher shear during mixing, so polymer compositions formed using a twin screw extruder can exhibit better elongation and tensile properties.

The polymer compositions can also include compounds that improve the hydrolytic stability of esters, silicones, stabilizers, flame retardants, plasticizers, colorants, reinforcing fillers and/or lubricants. Preferably, the total amount of these compounds in the polymer compositions is from about 50 to about 200 parts per 100 parts of total amount of polymer (olefinic polymer, polar polymer and compatibilizer). When the composition includes antioxidants or lubricants, these compounds make up from about 100 parts per million to about 10 weight percent of the composition relative to the total amount of polymer (olefinic polymer, polar polymer and compatibilizer).

Examples of compounds that improve the stability of esters include polycarbodiimides, such as aromatic polycarbodiumides. These compounds are available from, for example, Bayer.

Examples of colorants include organic and inorganic colorants. Colorants are available from, for example, Ciba Geigy, BASF, Ferro, ICI, Harwick and Teknor Apex.

Examples of flame retardants include aluminum trihydrate, magnesium hydroxide, phosphorus compounds, nitrogen compounds, zinc borates, halogenated compounds, and Ultracarb (Microfine Minerals). Flame retardants are available from, for example, Lonza, Alcoa, Alcan, Huber, Martin Marietta, Hoechst Celanese, U.S. Borax, Melamine Chemicals, Microfine Minerals and Anzon.

Examples of stabilizers include heat stabilizers, metal deactivators and ultraviolet stabilizers. Stabilizers are available from, for example, Ciba Geigy, Sandoz, Cytec, Eastman Chemicals, Fairmount Chemicals, Hoechst Celanese and General Electric.

Examples of plasticizers include phosphate ester plasticizers, phosphoric esters, fatty acid esters, esters of azelaic acid, esters of sebacic acid, trimellitic esters and polymeric plasticizers. When the polymer compositions are used in flame retardant applications, phosphate ester plasticizers are preferably used. Plasticizers are available from, for example, Solutia, Teknor Apex, Ferro, Exxon, Eastman Chemical and Uniflex Chemical.

Lubricants are available from, for example, Akzo, Dow Corning, DuPont, Astor Wax, Henkel, Witco and Struktol.

Silicones are available from, for example, General Electric, Wacker silicones and Dow Corning.

Examples of reinforcing fillers include clay, silica and calcium carbonate. Reinforcing fillers are available from, for example, Haber, Engelhard and PPG.

The polymer compositions preferably have an elongation of at least about 100% as measured according to ASTM D-638.

The polymer compositions preferably have a tensile strength of at least about 1000 as measured according to ASTM D-638.

The polymer compositions preferably have a peak smoke rating of less than 3/meter as measured using cone calorimetry according to ASTM E-1354.

When used for flame retardant applications, the polymer compositions preferably have a limiting oxygen index of at least about 30 as measured by ASTM D-2863.

Table I lists polymer compositions and their properties. These compositions were prepared using a Brabender mixer (PL 2000 with roller type blades). The speed was adjusted to keep the mixture at about 180° C. The polymers were mixed, and the filler was slowly added. This mixture was mixed for about five minutes, and the stabilizer was added. This mixture was mixed for about one minute, removed from the Brabender mixer and pressed to a thin sheet using a cool press. The resulting material was compression molded at about 220° C. This material was then cooled and the properties of the material were evaluated.

TABLE I

| | 1 | 2 | 3 | 4 | 5 | 6 | 7 | 8 | 9 | 10 |
|---|---|---|---|---|---|---|---|---|---|---|
| Ethylene Vinyl Acetate Copolymer[1] | | | | | | 50 | 45 | 45 | 50 | 45 |
| Ethylene Vinyl Acetate Copolymer[2] | 50 | 45 | 50 | 45 | 45 | | | | | |
| Polypropylene Copolymer[3] | 50 | 45 | 50 | 45 | 45 | 50 | 45 | 45 | 50 | 45 |
| Polypropylene Copolymer[4] | | | | | | | | | | |
| Maleic Acid Modified Polypropylene[5] | | 5 | | 5 | 5 | | 5 | 5 | | 5 |
| Ethylene Butyl Acrylate Epoxide[6] | | 5 | | 5 | 5 | | 5 | 5 | | 5 |
| Silicone Resin[7] | | | 3 | 3 | 3 | | | 3 | | |
| Silicone Resin[8] | | | | | | | | | 3 | 3 |
| Magnesium Hydroxide[9] | 170 | 170 | 170 | 170 | 170 | 170 | 170 | 170 | 170 | 170 |
| Stearic Acid[10] | 0.4 | 0.4 | 0.4 | 0.4 | 0.4 | 0.4 | 0.4 | 0.4 | 0.4 | 0.4 |
| Anti-oxidant[11] | 0.4 | 0.4 | 0.4 | 0.4 | 0.4 | 0.4 | 0.4 | 0.4 | 0.4 | 0.4 |
| Metal Deactivator[12] | 0.4 | 0.4 | 0.4 | 0.4 | 0.4 | 0.4 | 0.4 | 0.4 | 0.4 | 0.4 |
| Hardness, Shore C[13] | 70/66 | 69/65 | 68/84 | 67/64 | 69/64 | 67/61 | 68/64 | 67/63 | 66/60 | 67/62 |
| Tensile Strength, PSI[14] | 1630 | 1930 | 1570 | 1940 | 1890 | 1400 | 1740 | 1730 | 1300 | 1560 |
| Elongation At Break, %[14] | 5 | 5 | 4 | 6 | 5 | 3 | 13 | 8 | 4 | 3 |
| Limiting Oxygen Index %[15] | 29 | 31 | 33 | 32 | 31 | 33 | 32 | 32 | 35 | 33 |
| Dielectric Constant (1 KHz)[16] | 3.5 | 3.5 | 3.5 | 3.5 | 3.5 | 3.6 | 3.7 | 3.6 | 3.7 | 3.6 |
| Dissipation Factor (1 KHz)[16] | 0.0037 | 0.0032 | 0.0032 | 0.0034 | 0.0040 | 0.0039 | 0.0043 | 0.0340 | 0.0035 | 0.0035 |

[1] Elvax 265, commercially available from DuPont
[2] Elvax 470, commercially available from DuPont
[3] Profax SR 256 M, commercially available from Montell
[4] Fortilene KB 4104, commercially available from Solvay
[5] Unite MP 1000, commercially available from Aristech
[6] Elvaloy AS, commercially available from DuPont
[7] 4-7051 silicone resin, commercially available from Dow Corning
[8] 4-7105 silicone resin, commercially available from Dow Corning
[9] Magnifin H5GV, commercially available from Lonza
[10] Stearic Acid, commercially available from Harwick Chemical Corporation
[11] Irganox/BNX 1010, commercially available from Ciba-Geigy
[12] Irganox MD 1024, commercially available from Ciba-Geigy
[13] ASTM D-2240
[14] ASTM D-638
[15] ASTM D-2863
[16] ASTM D-150

Table II lists polymer compositions and their properties. These compositions were prepared using a twin screw extruder (Berstoff Model 40). All ingredients were metered and added at the feed throat. The temperature was controlled such that the temperatures in the mixing zones was at most about 420° F. The mixing speed was about 170 rpm. The compositions were molded using the same method as used for the compositions in Table I. As shown in Table II, the materials prepared using a twin screw extruder exhibited better elongation properties relative to materials prepared using lower shear methods.

TABLE II

| | | | |
|---|---|---|---|
| Ethylene Vinyl Acetate copolymer[1] | | | 55 |
| Ethylene Vinyl Acetate copolymer[2] | 45 | 65 | |
| Polypropylene Copolymer[3] | 45 | 25 | 35 |
| Maleic Acid Modified Polypropylene[4] | 5 | 5 | 5 |
| Ethylene Butyl Acrylate Epoxide[5] | 5 | 5 | 5 |
| Magnesium Hydroxide[6] | 170 | 170 | 170 |
| Zinc Stearate[7] | 0.4 | 0.4 | 0.4 |
| Anti-oxidant[7a] | 0.4 | 0.4 | 0.4 |
| Metal Deactivator[8] | 0.4 | 0.4 | 0.4 |
| Hindered Amine Light Stabilizer[9] | 0.4 | 0.4 | 0.4 |
| Silicone Resin[10] | 0.4 | 0.4 | 0.4 |
| Specific Gravity[11] | 1.44 | 1.44 | 1.46 |
| Hardness, Shore D (Inst/10 Sec.)[13] | 68/63 | 64/60 | 67/60 |
| Tensile strength (UTS), Psi[13] | 1600 | 1340 | 1280 |
| Elongation @ Break (EU), %[13] | 150 | 130 | 350 |
| Brittle Point, C.[14] | −21 | −11 | −6 |
| Dielectric Constant (1 KHz)[15] | 3.5 | 3.6 | 3.8 |
| Dissipation Factor (1 KHz)[15] | 0.00419 | 0.00457 | 0.00415 |
| Oxygen Index[14] | 35 | 35 | 36 |
| Peak Heat Release Rate, KW/SQM[17] | 146 | 171 | 156 |
| Avg. Heat Release Rate, KW/SQM[17] | 85 | 107 | 96 |
| Avg. Heat Release Rate @ 3 min., KW/SQM[17] | 116 | 134 | 115 |
| Total Heat Released, MJ/SQM[17] | 174 | 174 | 168 |
| Avg. Specific Extinction Area, SQM/Kg[17] | 143 | 248 | 295 |
| Peak Smoke, 1/M[17] | 0.5 | 0.9 | 0.9 |
| Time to Ignition, Sec.[17] | 110 | 134 | 112 |

[1] Elvax 265, commercially available from DuPont
[2] Elvax 470, commercially available from DuPont
[3] Profax SR 256 M, commercially available from Montell
[4] Unite MP 1000, commercially available from Aristech
[5] Elvalox AS, commercially available from DuPont
[6] Magnifin H5GV, commercially available from Lonza
[7] Zinc Stearate, commercially available from Harwick Chemical Corporation
[7a] Irganox BNX 1010, commercially available from Ciba-Geigy
[8] Irganox MD 1024, commercially available from Ciba-Geigy
[9] Chimsorb 944 FL, commercially available from Ciba-Geigy
[10] 4-7051 silicone resin, commercially available from Dow Corning
[11] ASTM D-792
[12] ASTM D-2240
[13] ASTM D-638
[14] ASTM D-746
[15] ASTM D-150
[16] ASTM D-2863
[17] ASTM E-13S4 (cone calorimetry)

Table III lists polymer compositions and their properties. These compositions were made according to the method discussed above with respect to Table I.

TABLE III

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Ethylene Vinyl Acetate copolymer[1] | | | | | | 65 | 65 | | | | | 50 | 45 | 50 | 45 |
| Ethylene Vinyl Acetate copolymer[2] | 65 | 65 | 65 | 65 | 65 | | | 50 | 45 | 50 | 45 | | | | |
| Polypropylene Copolymer[3] | | | | | | | | 50 | 45 | | | 50 | 45 | | |
| Polypropylene Copolymer[4] | 35 | 35 | 35 | 35 | 35 | 35 | 35 | | | 50 | 45 | | | 50 | 45 |
| Maleic Acid Modified Polypropylene[5] | | 0 | 3.5 | 5 | 10 | | 3.5 | | 5 | | 5 | | 5 | | 5 |
| Ethylene Butyl Acrylate Expoxide[6] | | 10 | 6.5 | 5 | 0 | | 6.6 | | 5 | | 5 | | 5 | | 5 |
| Stearic Acid[7] | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Hindered Amine Light Stabilizer[8] | 0.4 | 0.4 | 0.4 | 0.4 | 0.4 | 0.4 | 0.4 | | | | | | | | |
| Anti-oxidant[9] | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Metal Deactivator[10] | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Hardness, Shore D[11] | 47/42 | 48/44 | 47/43 | 47/41 | 47/41 | 49/45 | 49/45 | 57/53 | 55/50 | 59/54 | 58/54 | 55/50 | 57/52 | 58/52 | 56/51 |
| Tensile Strength, PSI[12] | 2180 | 1440 | 2920 | 3780 | 2070 | 1850 | 2230 | 1750 | 3090 | 2710 | 2880 | 2160 | 3540 | 2190 | 3750 |
| Elongation At Break, %[12] | 660 | 460 | 600 | 680 | 540 | 540 | 500 | 240 | 530 | 520 | 470 | 490 | 590 | 450 | 620 |
| Limiting Oxygen Index[13] | 16 | 18 | 17 | 18 | 19 | 19 | 18 | 18 | 17 | 17 | 18 | 18 | 18 | 18 | 18 |
| Dielectric Constant (1 KHz)[14] | 2.91 | 2.89 | 2.97 | 2.97 | 2.94 | 2.86 | 2.79 | 2.5 | 2.5 | 2.5 | 2.5 | 2.6 | 2.7 | 2.7 | 2.7 |
| Dissipation Factor (1 KHz)[14] | | | | | | | | 0.0010 | 0.0009 | 0.0011 | 0.0010 | 0.0310 | 0.0318 | 0.0011 | 0.0011 |

[1]Elvax 265, commercially available from DuPont
[2]Elvax 470, commercially available from DuPont
[3]Profax SR 256 M, commercially available from Montell
[4]Fortilene KB 4104, commercially available from Solvay
[5]Unite MP 1000, commercially available from Aristech
[6]Elvaloy AS, commercially available from DuPont
[7]Stearic Acid, commercially available from Harwick Chemical Corporation
[8]Chimsorb 944 FL, commercially available from Ciba-Geigy
[9]Irganox 1010, commercially available from Ciba-Geigy
[10]Irganox 1024, commercially available from Ciba-Geigy
[11]ASTM D-2240
[12]ASTM D-638
[13]ASTM D-2863
[14]ASTM D-150

Table IV lists polymer compositions and their properties. These compositions were prepared by mixing the olefinic polymers and polar polymers in a Banbury mixer (Farrel Midget Banbury mixer) using a medium rotor speed. When the mixture reached a temperature of about 10° C. greater than the melting temperature of polyethylene, about one half of the filler (ATH) was added and mixed. Then the remaining half of the filler (ATH) was added. The mixing speed was reduced, and the mixture was mixed for about five minutes. The stabilizers were added to this mixture while maintaining a low rotor speed, and this mixture was mixed for about one minute. The resulting compositions were molded as described for the compositions of Table I.

TABLE IV

| | | | |
|---|---|---|---|
| Ethylene Vinyl Acetate copolymer[1] | 100 | 100 | 100 |
| Ethylene Butyl Acrylate Epoxide[2] | 20 | 20 | 20 |
| Maleic Acid Modified Ethylene Vinyl Acetate terpolymer[3] | 100 | 100 | 100 |
| Maleic Acid Modified Polyethylene[4] | 10 | 10 | 10 |
| Polyethylene[5] | 100 | 100 | 100 |
| Aluminum Trihydrate[6] | 690 | 620 | 560 |
| Anti-Oxidant[7] | 2 | 2 | 2 |
| Specific Gravity[8] | 1.6 | 1.56 | 1.52 |
| Hardness, Shore D[9] | 66/62 | 64/60 | 62/57 |
| Tensile Strength (TS), PSI[10] | 2340 | 2220 | 2170 |
| Elongation (EU), %[10] | 110 | 130 | 140 |
| Dielectric Constant (1 KHz)[11] | 4.02 | 3.95 | 3.9 |
| Dissipation Factor (1 KHz)[11] | 0.0085 | 0.0063 | 0.0077 |
| Limiting Oxygen Index, %[12] | 40 | 35 | 34 |
| Peak Heat Release Rate, KW/SQM[13] | 166 | 184 | 156 |
| Avg. Heat Release Rate, KW/SQM[13] | 83 | 92 | 94 |
| Avg. Heat Release Rate @ 3 min., KW/SQM[13] | 73 | 88 | 86 |
| Total Heat Released, MJ/SQM[13] | 138 | 153 | 155 |
| Avg. Specific Extinction Area, SQM/Kg[13] | 240 | 260 | 232 |

TABLE IV-continued

| | | | |
|---|---|---|---|
| Peak Smoke, 1/M[13] | 1.4 | 1.6 | 1 |
| Time to Ignition, Sec.[13] | 162 | 140 | 124 |

[1]Elvax 265, commercially available from DuPont
[2]Elvaloy AS, commercially available from DuPont
[3]Fusabond C MC 250D, commercially available from DuPont
[4]Fusabond E MB 100D, commercially available from DuPont
[5]Engage 8480, commercially available from Dow DuPont Joint Venture
[6]Hydral 710, commercially available from Alcoa
[7]Irganox 1010, commercially available from Ciba-Geigy
[8]ASTM D-792
[9]ASTM D-2240
[10]ASTM D-638
[11]ASTM D-150
[12]ASTM D-2863
[13]ASTM E-1354 (cone calorimetry)

Other embodiments are in the claims.

What is claimed is:

1. A composition, comprising:
   a blend including:
      an olefinic polymer,
      a polar polymer; and
   a compatibilizer, wherein the compatibilizer is a graft or block copolymer having first and second polymer portions, the first polymer portion being compatible with the olefinic polymer and the second polymer portion being compatible with the polar polymer; and
   a flame retardant,
      wherein the ratio of the weight % of the polar polymer to the weight % of the olefinic polymer is 1:1 or greater, wherein both the olefinic polymer and the polar polymer are substantially free of halogen, wherein the composition contains a sufficient amount of the compatibilizer such that the tensile strength of the composition is improved by at least about 18% relative to a composition without the compatibilizer, wherein the composition contains about 50 parts to about 200 parts by weight of flame retardant per 100 parts total amount of polymer, and wherein the composition has a limiting oxygen index of at least about 30.

2. The composition according to claim 1, wherein the polar polymer includes ethylene monomers and vinyl acetate monomers.

3. The composition according to claim 2, wherein the second polymer portion includes ethylene monomers and vinyl acetate monomers.

4. The composition according to claim 2, wherein the polar polymer further includes carbon monoxide monomers.

5. The composition according to claim 4, wherein the second polymer portion includes ethylene monomers and vinyl acetate monomers.

6. The composition according to claim 1, wherein the olefinic polymer includes ethylene monomers.

7. The composition according to claim 6, wherein the first polymer portion includes ethylene monomers.

8. The composition according to claim 1, wherein the olefinic polymer comprises polyethylene.

9. The composition according to claim 8, wherein the first polymer portion-includes ethylene monomers.

10. The composition according to claim 1, wherein the olefinic polymer includes propylene monomers.

11. The composition according to claim 10, wherein the first polymer portion includes propylene monomers.

12. The composition according to claim 1, wherein the olefinic polymer comprises polypropylene.

13. The composition according to claim 12, wherein the first polymer portion includes propylene monomers.

14. The composition according to claim 1, wherein the olefinic polymer is selected from the group consisting of polyethylene, ethylene copolymers, polypropylene, propylene copolymers, ethylene propylene copolymers, and polymethylpentene.

15. The composition according to claim 14, wherein the first polymer portion includes ethylene monomers.

16. The composition according to claim 14, wherein the first polymer portion includes propylene monomers.

17. The composition according to claim 1, wherein the olefinic polymer includes ethylene monomers.

18. The composition according to claim 17, wherein the first polymer portion includes ethylene monomers.

19. The composition according to claim 17, wherein the olefinic polymer comprises polyethylene.

20. The composition according to claim 19, wherein the first polymer portion includes ethylene monomers.

21. The composition according to claim 1, wherein the composition comprises from about 35 weight percent to about 50 weight percent of the olefinic polymer, from about 50 weight percent to about 65 weight percent of the polar polymer, and from about 5 weight percent to about 20 weight percent of the compatibilizer.

22. The composition according to claim 1, further comprising a compound selected from the group consisting of a filler, a stabilizer, a plasticizer and a lubricant.

23. The composition according to claim 1, wherein the ratio of the weight % of the polar polymer to the weight % of the olefinic polymer ranges from about 1.5:1 to about 2:1.

24. The composition according to claim 1, wherein the second polymer portion of the third polymer and the polar polymer both include the same functional groups.

25. The composition of claim 1, wherein the tensile strength of the composition is improved by at least about 20%.

26. The composition of claim 1, wherein the tensile strength of the composition is improved by at least about 24%.

27. The composition of claim 1, wherein the tensile strength of the composition is improved by at least about 34%.

28. The composition of claim 1, wherein the tensile strength of the composition is improved by at least about 64%.

29. The composition of claim 1, wherein the tensile strength of the composition is improved by at least about 71%.

30. The composition of claim 1, wherein the tensile strength of the composition is improved by at least about 73%.

31. The composition of claim 1, wherein the tensile strength of the composition is improved by at least about 77%.

32. The composition of claim 1, wherein the first polymer portion of the compatibilizer comprises an epoxy-containing terpolymer of ethylene, vinyl acetate, and carbon monoxide and the second polymer portion of the compatibilizer comprises a maleic acid modified polypropylene.

33. The composition of claim 1, wherein the first polymer portion of the compatibilizer comprises an epoxy-containing styrene ethylene butylene styrene block copolymer and the second polymer portion of the compatibilizer comprises an ethylene methyl acrylate acid-containing polar polymer.

34. The composition of claim 1, wherein the composition comprises from about 5 weight percent to about 20 weight percent of the compatibilizer.

35. The composition of claim 1, wherein the composition contains about 170 parts to about 200 parts by weight of flame retardant per 100 parts total amount of polymer.

36. A method of forming a composition, comprising:
 (a) forming a compatibilizer that is a graft or block copolymer comprising first and second polymer portions in a mixture comprising an olefinic polymer and a polar polymer, thereby forming a blend, wherein the first polymer portion is compatible with the olefinic polymer and the second polymer portion is compatible with the polar polymer, and
 (b) combining the blend with a flame retardant,
  wherein the ratio of the weight % of the polar polymer to the weight % of the olefinic polymer is 1:1 or greater, wherein both the olefinic polymer and the polar polymer are substantially free of halogen, wherein the composition contains a sufficient amount of the compatibilizer such that the tensile strength of the composition is improved by at least about 18% relative to a composition without the compatibilizer, wherein the composition contains about 50 parts to about 200 parts by weight of flame retardant per 100 parts total amount of polymer, and wherein the composition has a limiting oxygen index of at least about 30.

37. The method of claim 36, wherein the composition contains about 170 parts to about 200 parts by weight of flame retardant per 100 parts total amount of polymer.

38. A method of forming a composition, comprising:
 (a) forming a compatibilizer that is a graft or block copolymer comprising first and second polymer portions;
 (b) mixing the compatibilizer in a mixture comprising an olefinic polymer and a polar polymer, thereby forming a blend, wherein the first polymer portion is compatible with the olefinic polymer and the second polymer portion is compatible with the polar polymer; and (c) combining the blend with a flame retardant, wherein the ratio of the weight % of the polar polymer to the weight % of the olefinic polymer is 1:1 or greater, wherein both the olefinic polymer and the polar polymer are substantially free of halogen, wherein the composition contains a sufficient amount of the compatibilizer such that the tensile strength of the composition is improved by at least about 18% relative to a composition without the copolymer, wherein the composition contains about 50 parts to about 200 parts by weight of flame retardant per 100 parts total amount of polymer, and wherein the composition has a limiting oxygen index of at least about 30.

39. The method of claim 38, wherein the composition contains about 170 parts to about 200 parts by weight of flame retardant per 100 parts total amount of polymer.

40. A composition, comprising:
 (a) a blend of polymers consisting essentially of (i) an olefinic polymer substantially free of halogen; (ii) a polar polymer substantially free of halogen; and (iii) a compatibilizer that is a graft or block copolymer comprising first and second polymer portions, the first polymer portion being compatible with the olefinic polymer and the second polymer portion being compatible with the polar polymer,
  wherein the weight ratio of the polar polymer (ii) to the olefinic polymer (i) is 1:1 or greater, and wherein the weight ratio of the compatibilizer (iii) to the combined weight of the olefinic polyner (i) and the polar polymer (ii) is about 0.11:1 or greater;
 (b) non-polymer additives; and
 (c) about 50 parts to about 200 parts by weight of a flame retardant per 100 parts total amount of polymer,
  wherein the composition has a limiting oxygen index of at least about 30.

41. A composition, comprising:
a blend including:
 an olefinic polymer;
 a polar polymer; and
 a compatibilizer, wherein the compatibilizer is a graft or block copolymer having first and second polymer portions, the first polymer portion being compatible with the olefinic polymer and the second polymer portion being compatible with the polar polymer, and
a flame retardant,
 wherein the weight ratio of the polar polymer to the olefinic polymer is between 1:1 and about 5.3:1, wherein both the olefinic polymer and the polar polymer are substantially free of halogen, wherein the composition has an elongation of at least about 110%, wherein the composition contains a sufficient amount of the compatibilizer such that the tensile strength of the composition is improved by at least about 18% relative to a composition without the compatibilizer, wherein the composition contains about 50 parts to about 200 parts by weight of the flame retardant per 100 parts total polymer, and wherein the composition has a limiting oxygen index of at least about 30.

42. A composition, comprising:
a blend including:
 an olefinic polymer;
 a polar polymer; and
 a compatibilizer, wherein the compatibilizer is a graft or block copolymer having first and second polymer portions, the first polymer portion being compatible with the olefinic polymer and the second polymer portion being compatible with the polar polymer; and
a flame retardant,
 wherein the weight ratio of the polar polymer to the olefinic polymer is between about 1.6:1 and about 2.5:1, wherein both the olefinic polymer and the polar polymer are substantially free of halogen, wherein the composition has an elongation of at least about 110%, wherein the composition contains a sufficient amount of the compatibilizer such that the tensile strength of the composition is improved by at least about 18% relative to a composition without the compatibilizer, wherein the composition contains about 50 parts to about 200 parts by weight of flame retardant per 100 parts total amount of polymer, and wherein the composition has a limiting oxygen index of at least about 30.

43. The composition of claim 42, wherein the composition further comprises a compound selected from the group consisting of a filler, a stabilizer, a plasticizer and a lubricant.

44. A composition, comprising:
a flame retardant; and
a blend including:
 an olefinic polymer,
 a polar polymer; and
 a compatibilizer, wherein the compatibilizer is a graft or block copolymer having first and second polymer portions, the first polymer portion being compatible with the olefinic polymer and the second polymer portion being compatible with the polar polymer, wherein the composition has a limiting oxygen index of at least about 30, and wherein the composition contains about 50 parts to about 200 parts by weight of flame retardant per 100 parts total amount of polymer.

45. The composition of claim 44, wherein the composition contains about 170 parts to about 200 parts by weight of flame-retardant per 100 parts total amount of polymer.

46. A method of forming a composition, comprising:
   (a) forming a compatibilizer that is a graft or block copolymer comprising first and second polymer portions in a mixture comprising an olefinic polymer and a polar polymer to form a blend, and
   (b) combining the blend with a flame retardant,
      wherein the first polymer portion is compatible with the olefinic polymer and the second polymer portion is compatible with the polar polymer, wherein the composition contains about 50 parts to about 200 parts by weight of flame retardant per 100 parts total amount of polymer, and wherein the composition has a limiting oxygen index of at least about 30.

47. The method of claim 46, wherein the composition contains about 170 parts to about 200 parts by weight of flame retardant per 100 parts total amount of polymer.

48. A method of forming a composition, comprising:
   (a) forming a compatibilizer that is a graft or block copolymer comprising first and second polymer portions;
   (b) mixing the copolymer in a mixture comprising an olefinic polymer and a polar polymer to form a blend, wherein the first polymer portion is compatible with the olefinic polymer and the second polymer portion is compatible with the polar polymer, and
   (c) combining the blend with a flame retardant,
      wherein the composition contains about 50 parts to about 200 parts by weight of flame retardant per 100 parts total amount of polymer, and wherein the composition has a limiting oxygen index of at least about 30.

49. The method of claim 48, wherein the composition contains about 170 parts to about 200 parts by weight of flame retardant per 100 parts total amount of polymer.

50. A composition, comprising:
   a blend including:
      an olefinic polymer;
      a polar polymer, and
   a compatibilizer, wherein the compatibilizer is a graft or block copolymer having first and second polymer portions, the first polymer portion being compatible with the olefinic polymer and the second polymer portion being compatible with the polar polymer; and
   a flame retardant,
      wherein the ratio of the weight % of the polar polymer to the weight % of the olefinic polymer is 1:1 or greater, wherein both the olefinic polymer and the polar polymer are substantially free of halogen, wherein the composition contains a sufficient amount of the compatibilizer such that the tensile strength of the composition is improved by at least about 18% relative to a composition without the compatibilizer, wherein the composition contains 209 parts by weight of flame retardant per 100 parts total amount of polymer, and wherein the composition has a limiting oxygen index of at least about 30.

51. A method of forming a composition, comprising:
   (a) forming a compatibilizer that is a graft or block copolymer comprising first and second polymer portions in a mixture comprising an olefinic polymer and a polar polymer, thereby forming a blend, wherein the first polymer portion is compatible with the olefinic polymer and the second polymer portion is compatible with the polar polymer, and
   (b) combining the blend with a flame retardant,
      wherein the ratio of the weight % of the polar polymer to the weight % of the olefinic polymer is 1:1 or greater, wherein both the olefinic polymer and the polar polymer are substantially free of halogen, wherein the composition contains a sufficient amount of the compatibilizer such that the tensile strength of the composition is improved by at least about 18% relative to a composition without the compatibilizer, wherein the composition contains 209 parts by weight of flame retardant per 100 parts total amount of polymer, and wherein the composition has a limiting oxygen index of at least about 30.

52. A method of forming a composition, comprising:
   (a) forming a compatibilizer that is a graft or block copolymer comprising first and second polymer portions;
   (b) mixing the compatibilizer in a mixture comprising an olefinic polymer and a polar polymer, thereby forming a blend, wherein the first polymer portion is compatible with the olefinic polymer and the second polymer portion is compatible with the polar polymer; and (c) combining the blend with a flame retardant, wherein the ratio of the weight % of the polar polymer to the weight % of the olefinic polymer is 1:1 or greater, wherein both the olefinic polymer and the polar polymer are substantially free of halogen, wherein the composition contains a sufficient amount of the compatibilizer such that the tensile strength of the composition is improved by at least about 18% relative to a composition without the copolymer, wherein the composition contains 209 parts by weight of flame retardant per 100 parts total amount of polymer, and wherein the composition has a limiting oxygen index of at least about 30.

53. A composition, comprising:
   (a) a blend of polymers consisting essentially of (i) an olefinic polymer substantially free of halogen; (ii) a polar polymer substantially free of halogen; and (iii) a compatibilizer that is a graft or block copolymer comprising first and second polymer portions, the first polymer portion being compatible with the olefinic polymer and the second polymer portion being compatible with the polar polymer,
      wherein the weight ratio of the polar polymer (ii) to the olefinic polymer (i) is 1:1 or greater, and wherein the weight ratio of the compatibilizer (iii) to the combined weight of the olefinic polymer (i) and the polar polymer (ii) is about 0.11:1 or greater;
   (b) non-polymer additives; and
   (c) 209 parts by weight of a flame retardant per 100 parts total amount of polymer, wherein the composition has a limiting oxygen index of at least about 30.

54. A composition, comprising:
   a blend including:
      an olefinic polymer;
      a polar polymer; and
      a compatibilizer, wherein the compatibilizer is a graft or block copolymer having first and second polymer portions, the first polymer portion being compatible with the olefinic polymer and the second polymer portion being compatible with the polar polymer; and a flame retardant,
wherein the weight ratio of the polar polymer to the olefinic polymer is between 1:1 and about 5.3:1, wherein both the olefinic polymer and the polar polymer are substantially free of halogen, wherein the composition has an elongation of at least about 110%, wherein the composition contains a sufficient amount of the compatibilizer such that the tensile strength of the composition is improved by at least about 18% relative to a composition without the compatibilizer, wherein the composition contains 209 parts by weight of the flame retardant per 100 parts total polymer, and wherein the composition has a limiting oxygen index of at least about 30.

55. A composition, comprising:
a blend including:
    an olefinic polymer;
    a polar polymer; and
    a compatibilizer, wherein the compatibilizer is a graft or block copolymer having first and second polymer portions, the first polymer portion being compatible with the olefinic polymer and the second polymer portion being compatible with the polar polymer; and
a flame retardant,
    wherein the weight ratio of the polar polymer to the olefinic polymer is between about 1.6:1 and about 2.5:1, wherein both the olefinic polymer and the polar polymer are substantially free of halogen, wherein the composition has an elongation of at least about 110%, wherein the composition contains a sufficient amount of the compatibilizer such that the tensile strength of the composition is improved by at least about 18% relative to a composition without the compatibilizer, wherein the composition contains 209 parts by weight of flame retardant per 100 parts total amount of polyner, and wherein the composition has a limiting oxygen index of at least about 30.

56. A composition, comprising:
a flame retardant; and
a blend including:
    an olefinic polymer;
    a polar polymer; and
    a compatibilizer, wherein the compatibilizer is a graft or block copolymer having first and second polymer portions, the first polymer portion being compatible with the olefinic polymer and the second polymer portion being compatible with the polar polymer, wherein the composition has a limiting oxygen index of at least about 30, and wherein the composition contains 209 parts by weight of flame retardant per 100 parts total amount of polymer.

57. A method of forming a composition, comprising:
(a) forming a compatibilizer that is a graft or block copolymer comprising first and second polymer portions in a mixture comprising an olefinic polymer and a polar polymer to form a blend, and
(b) combining the blend with a flame retardant,
    wherein the first polymer portion is compatible with the olefinic polymer and the second polymer portion is compatible with the polar polymer, wherein the composition contains 209 parts by weight of flame retardant per 100 parts total amount of polymer, and wherein the composition has a limiting oxygen index of at least about 30.

58. A method of forming a composition, comprising:
(a) forming a compatibilizer that is a graft or block copolymer comprising first and second polymer portions;
(b) mixing the copolymer in a mixture comprising an olefinic polymer and a polar polymer to form a blend, wherein the first polymer portion is compatible with the olefinic polymer and the second polymer portion is compatible with the polar polymer, and
(c) combining the blend with a flame retardant,
    wherein the composition contains 209 parts by weight of flame retardant per 100 parts total amount of polymer, and wherein the composition has a limiting oxygen index of at least about 30.

* * * * *

UNITED STATES PATENT AND TRADEMARK OFFICE
CERTIFICATE OF CORRECTION

PATENT NO. : 6,608,135 B1
DATED : August 19, 2003
INVENTOR(S) : Raman Patel et al.

It is certified that error appears in the above-identified patent and that said Letters Patent is hereby corrected as shown below:

<u>Title page</u>,
Item [56], References Cited, U.S. PATENT DOCUMENTS, replace "11/1993" with -- 11/1998 --.

<u>Column 9</u>,
Line 61, replace "portion-includes" with -- portion includes --.

Signed and Sealed this

Thirtieth Day of March, 2004

JON W. DUDAS
*Acting Director of the United States Patent and Trademark Office*